US008308072B2

(12) United States Patent
Satake et al.

(10) Patent No.: US 8,308,072 B2
(45) Date of Patent: Nov. 13, 2012

(54) NON-CONTACT IC TAG

(75) Inventors: Hikaru Satake, Otsu (JP); Kiyohiko Ito, Otsu (JP)

(73) Assignee: Toray Industries, Inc., Tokyo (JP)

( * ) Notice: Subject to any disclaimer, the term of this patent is extended or adjusted under 35 U.S.C. 154(b) by 165 days.

(21) Appl. No.: 12/937,633

(22) PCT Filed: Apr. 15, 2009

(86) PCT No.: PCT/JP2009/057550

§ 371 (c)(1), (2), (4) Date: Oct. 13, 2010

(87) PCT Pub. No.: WO2009/131041

PCT Pub. Date: Oct. 29, 2009

(65) Prior Publication Data

US 2011/0024512 A1 Feb. 3, 2011

(30) Foreign Application Priority Data

Apr. 24, 2008 (JP) ................................ 2008-113591
Nov. 7, 2008 (JP) ................................ 2008-286494

(51) Int. Cl.
*G06K 19/06* (2006.01)

(52) U.S. Cl. ....................................... 235/492; 235/451

(58) Field of Classification Search .................. 235/492; 361/737; 340/572.7
See application file for complete search history.

(56) References Cited

U.S. PATENT DOCUMENTS 7,277,017 B2 * 10/2007 Baba et al. ................. 340/572.7
7,494,068 B2 * 2/2009 Patrice .......................... 235/492
2006/0273179 A1 * 12/2006 Yamakage et al. ............ 235/492
2011/0168788 A1 * 7/2011 Sonoda et al. ................ 235/492

FOREIGN PATENT DOCUMENTS

JP 7-77325 B2 8/1995
JP 10-150319 6/1998
JP 2002-522999 A 7/2002

(Continued)

OTHER PUBLICATIONS

Edited by The Institute of Electronics, Information and Communication Engineers, Antenna Kogaku Handbook, $1^{st}$. Edition, $10^{th}$ Print, Ohmsha Ltd., Mar. 5, 1999, pp. 112-119.

(Continued)

*Primary Examiner* — Ahshik Kim
(74) *Attorney, Agent, or Firm* — RatnerPrestia

(57) ABSTRACT

A non-contact IC tag includes an insulating substrate, an IC tag having an IC chip and a matching-circuit equipped dipole antenna connected with the IC chip, and a first and second parasitic antenna both provided at the other side of the insulating substrate. The matching-circuit equipped dipole antenna has two antenna sections, a connecting terminal section and a matching circuit section. Projection images of the first and second parasitic antennae onto the one side of the insulating substrate respectively overlap at least portions of the two antenna sections of the matching-circuit equipped dipole antenna. The first and second parasitic antennae are made electrically conductive by a connected portion, and the projection images of the first and second parasitic antennae, and the connected portion onto the one side of the insulating substrate do not overlap the IC chip and the connecting terminal section of the matching-circuit equipped dipole antenna.

12 Claims, 5 Drawing Sheets

FOREIGN PATENT DOCUMENTS

| | | | |
|---|---|---|---|
| JP | 2003-110329 | A | 4/2003 |
| JP | 2004-147351 | | 5/2004 |
| JP | 3628668 | B2 | 12/2004 |
| JP | 2005-210676 | | 8/2005 |
| JP | 2005-236468 | | 9/2005 |
| JP | 2006-033298 | | 2/2006 |
| JP | 2006-129092 | | 5/2006 |
| JP | 2006-324766 | A | 11/2006 |
| JP | 2007-241788 | | 9/2007 |
| JP | 2007-277080 | | 10/2007 |
| JP | 2007-311955 | | 11/2007 |

OTHER PUBLICATIONS

International Search Report dated May 19, 2009, application No. PCT/JP2009/057550.

Edited by the Institute of Electronics, Information and Communication Engineers, Antenna Kogaku Handbook, 1st. Edition, 10th Print, Ohmsha Ltd., Mar. 5, 1999, pp. 112 to 119.

* cited by examiner

NON-CONTACT IC TAG

CROSS-REFERENCE TO RELATED APPLICATIONS

This application is the U.S. National Phase application of PCT International Application No. PCT/JP2009/057550, filed Apr. 15, 2009, and claims priority of Japanese Patent Application Nos. 2008-113591, filed Apr. 24, 2008 and 2008-286494, filed Nov. 7, 2008, the disclosures of which applications are incorporated herein by reference in their entirety for all purposes.

FIELD OF THE INVENTION

The present invention relates to a non-contact IC tag. The invention relates to a non-contact IC tag whose communication performance is little influenced by a metal member to which it is stuck. In particular, the invention relates to a passive-type non-contact IC tag that uses radio wave (microwave) to achieve transmission.

BACKGROUND OF THE INVENTION

A non-contact IC tag comprises an antenna circuit and an IC chip (chip with a built-in integrated circuit) that stores required information. A non-contact IC tag is placed at a distance, for instance stuck on an object located at a distance. Thus, the information stored in one or more non-contact IC tags are obtained through radio transmission between these non-contact IC tags and an external antenna located at a distance from them. The information acquisition using non-contact IC tags has good features that cannot be achieved by the information acquisition mechanism based on bar codes, and in particular, their use is promoted in the field of distribution of merchandise.

Some common non-contact IC tags suffer serious influence on its communication performance caused by the object that carries them. If the tag-carrying object is metal, in particular, the communication between the non-contact IC tag installed on it and the external antenna can be impeded seriously. Specifically, if a non-contact IC tag is installed on a metal member, the impedance matching between the IC chip in the non-contact IC tag and the antenna in the non-contact IC tag can deteriorate largely.

As a result, the electric power gained through the radio wave resonance in the antenna will not be supplied to the IC chip efficiently, failing to obtain electric power required to drive the IC chip. This makes impossible to achieve information transmission between the non-contact IC tag and a reader/writer located at a distance from the non-contact IC tag. This phenomenon will be particularly noticeable in cases where radio wave (microwave) is used as transmission means in combination with passive-type non-contact IC tags which do not use a battery. Various non-contact IC tags have been developed to solve this problem. Of such IC tags, well-known ones include the following.

(1) An IC tag comprising a first antenna formed on a first insulating material and a second antenna formed with a second insulating material in between, wherein the length of the second antenna is adjusted to an appropriate value to allow the IC tag to perform communication when located on a metal member (Patent Literature 1).

(2) An IC tag comprising a plastic base with a dipole antenna on one side and a metal layer on the other side wherein stripe-like portions of the metal layer extending in the direction perpendicular to the dipole antenna are removed (Patent Literature 2).

(3) An IC tag comprising a foamed resin inserted between the IC tag and a metal member carrying the IC tag so that the contact between the IC tag and the metal member is avoided to reduce the influence of the metal to make communication possible (Patent Literature 3).

(4) An IC tag comprising a magnetic material inserted between the IC tag and a metal member carrying the IC tag to decrease the influence of the metal to improve the communication (Patent Literature 4).

CITATION LIST

Patent Literature

Patent Literature 1: JP 2005-210676 A

Patent Literature 2: JP 2007-311955 A

Patent Literature 3: JP 2007-241788 A

Patent Literature 4: JP 2007-277080 A

SUMMARY OF THE INVENTION

Use of the aforementioned various IC tags permits communication when these IC tags are installed on a metal member. However, in the IC tags (1) and (2), it is difficult to supply electric power to the IC chip, leading to a short communication distance, which is a problem. In the IC tag (3), the resin has to be thick to ensure a long communication distance, leading to the problem of difficulty in ensuring long distance communication, hence difficulty in developing thin IC tags. In the IC tag (4), furthermore, the magnetic material is expensive, leading to the problem of difficulty in producing IC tags at low cost.

In view of this state of prior art, the invention aims to provide a non-contact IC tag that is low-priced, thin, and able to perform long distance communication even when installed on a metal member. The invention particularly aims to provide a non-contact IC tag that can serve to construct a passive-type non-contact IC tag that uses radio wave (microwave) for transmission.

Described below is an embodiment (first embodiment) of the non-contact IC tag according to the invention.

A non-contact IC tag including an IC tag comprising a first insulating substrate, an IC chip fixed on one side of the first insulating substrate and a matching-circuit equipped dipole antenna electrically connected to the IC chip, and a first parasitic antenna and a second parasitic antenna spaced with a distance and fixed on the other side of the first insulating substrate, wherein the matching-circuit equipped dipole antenna has two antenna sections spaced with a distance, two connecting terminal sections each electrically connecting each of the two antenna sections to the IC chip, and a matching circuit section electrically connecting the two antenna sections to each other, and wherein (1-a) the projection images of the first parasitic antenna and the second parasitic antenna projected onto the one side of the first insulating substrate respectively overlap at least partially the two antenna sections of the matching-circuit equipped dipole antenna, (1-b) the first parasitic antenna and the second parasitic antenna are electrically connected to each other through a connected portion, and in addition, (1-c) the projection images of the first parasitic antenna, the second parasitic antenna, and the connected portion projected onto the one side of the first insulating substrate do not overlap the IC chip and the two connecting terminal sections of the matching-circuit equipped dipole antenna.

Described below is another embodiment (second embodiment) of the non-contact IC tag according to the invention.

A non-contact IC tag including an IC tag comprising a first insulating substrate, an IC chip fixed on one side of the first insulating substrate and a matching-circuit equipped dipole antenna electrically connected to the IC chip, and a first parasitic antenna and a second parasitic antenna spaced with a distance and fixed on the other side of the first insulating substrate, wherein the matching-circuit equipped dipole antenna has two antenna sections spaced with a distance, two connecting terminal sections each electrically connecting each of the two antenna sections to the IC chip, and a matching circuit section electrically connecting the two antenna sections to each other, and wherein (2-a) the projection images of the first parasitic antenna and the second parasitic antenna projected onto the one side of the first insulating substrate respectively overlap at least partially the two antenna sections of the matching-circuit equipped dipole antenna, (2-b) the first parasitic antenna and the second parasitic antenna are electrically connected to each other through a connected portion, and in addition, (2-c) the projection images of the first parasitic antenna, the second parasitic antenna, and the connected portion projected onto the one side of the first insulating substrate do not overlap, or only partially overlap, the matching circuit section of the matching-circuit equipped dipole antenna.

In the second embodiment, it is preferable that the projection images of the first parasitic antenna, the second parasitic antenna, and the connected portion projected onto the one side of the first insulating substrate do not overlap the matching circuit section of the matching-circuit equipped dipole antenna.

In the second embodiment, it is preferable that the projection images of the first parasitic antenna, the second parasitic antenna, and the connected portion projected onto the one side of the first insulating substrate do not overlap the IC chip and the two connecting terminal sections of the matching-circuit equipped dipole antenna.

In the first embodiment and the second embodiment, it is preferable that the first insulating substrate is in the form of a resin film.

In the first embodiment and the second embodiment, it is preferable that a second insulating substrate is laminated over the one side of the first insulating substrate.

In the first embodiment and the second embodiment, it is preferable that the first insulating substrate, the IC tag, the first parasitic antenna, the second parasitic antenna, and the connected portion are coated with a resin.

In the embodiment wherein the second insulating substrate is laminated, the first insulating substrate, the IC tag, the first parasitic antenna, the second parasitic antenna, the connected portion, and the second insulating substrate are coated with a resin.

If a non-contact IC tag according to an embodiment of the invention is used, normal communication can be maintained between the non-contact IC tag and a reader/writer even when the non-contact IC tag is attached to a metal member. If the non-contact IC tag according to an embodiment of the invention is used, a larger electric power is supplied to an IC chip contained there to increase the communication distance between the IC chip and the reader/writer, compared with a conventional non-contact IC tag alone is attached to a metal member. In particular, the non-contact IC tag according to an embodiment of the invention is preferably applied to a passive-type non-contact IC tag that uses radio wave (microwave) as means of transmission.

DETAILED DESCRIPTION OF THE INVENTION

Figure 1:
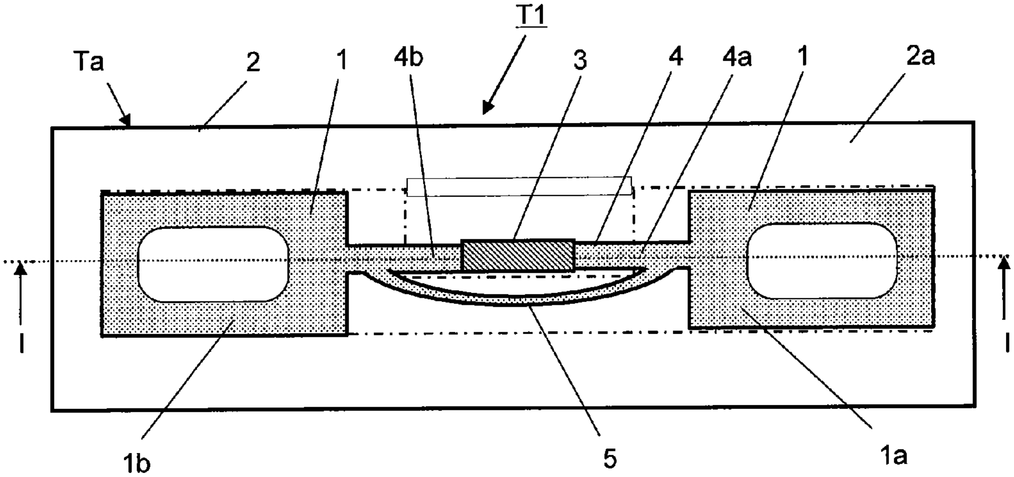
FIG. 1 shows a schematic plan view of the plane of a matching-circuit equipped dipole antenna in an embodiment (first embodiment) of the non-contact IC tag of the invention.
Figure 2:
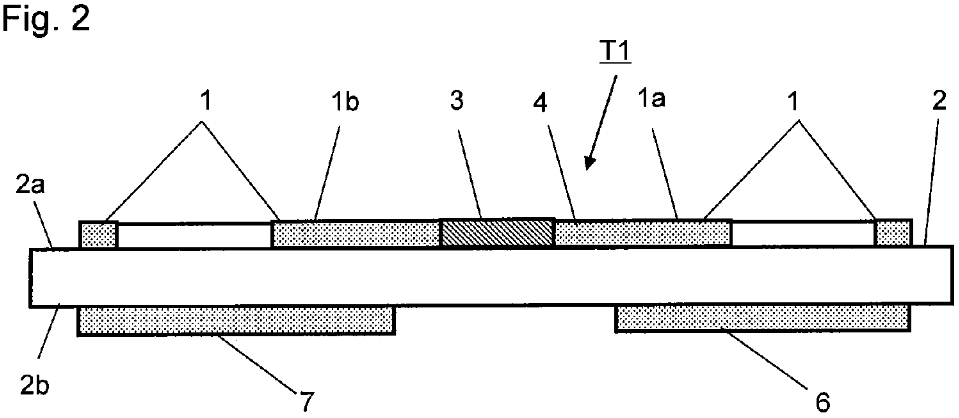
FIG. 2 shows the I-I cross section indicated by the arrows in FIG. 1.
Figure 3:
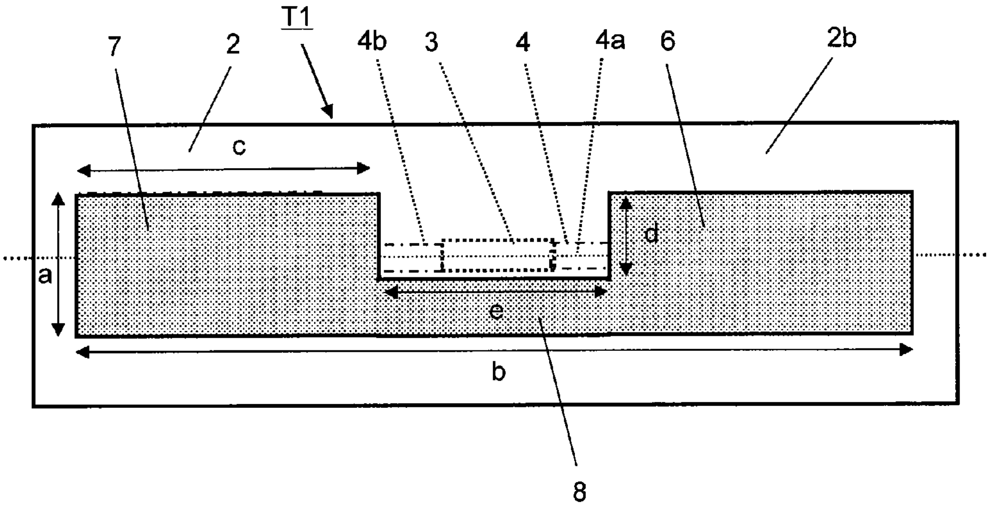
FIG. 3 shows a schematic plan view of an example of the plane of the parasitic antenna of the non-contact IC tag illustrated in FIG. 1.

FIGS. 1 to 3 show an example of an embodiment (first embodiment) of the non-contact IC tag according to the invention.

In FIGS. 1 to 3, a non-contact IC tag T1 of the invention includes an IC tag Ta comprising a first insulating substrate 2, an IC chip 3 provided on one side (first side) 2*a* of the first insulating substrate 2 and a matching-circuit equipped dipole antenna 1 electrically connected to the IC chip 3, and a first parasitic antenna 6 and a second parasitic antenna 7 spaced with a distance and provided on the other side (second side) 2*b* of the first insulating substrate 2.

The matching-circuit equipped dipole antenna 1 is composed of two antenna sections (a first antenna section 1*a* and a second antenna section 1*b*) spaced with a distance, two connecting terminal sections 4 (a first connecting terminal section 4*a* and a second connecting terminal section 4*b*) electrically connecting the first antenna section 1*a* and the second antenna section 1*b*, respectively, to the IC chip 3 and a matching circuit section 5 electrically connecting the first antenna section 1*a* and the second antenna section 1*b*.

The non-contact IC tag T1 that has a structure as described above also meets the following requirements (1A), (1B), and (1C).

(1A) The projection images of the first parasitic antenna 6 and the second parasitic antenna 7 projected onto the first side 2*a* of the first insulating substrate 2 respectively overlap at least partially the first antenna section 1*a* and the second antenna section 1*b* of the matching-circuit equipped dipole antenna 1.

(1B) The first parasitic antenna 6 and the second parasitic antenna 7 are electrically connected to each other through a connected portion 8.

(1C) The projection images of the first parasitic antenna 6, the second parasitic antenna 7, and the connected portion 8 projected onto the first side 2*a* of the first insulating substrate 2 do not overlap the IC chip 3, and the first connecting terminal section 4*a* and the second connecting terminal section 4*b* of the matching-circuit equipped dipole antenna 1.

The IC tag Ta comprises the IC chip 3 that stores information and the matching-circuit equipped dipole antenna 1 connected to the IC chip 3. The IC tag Ta and IC chip 3 may be commercially available non-contact IC tag and IC chip products. The IC tag Ta and IC chip 3 are preferably a passive-type non-contact IC tag and an IC chip that use radio wave (microwave) as means of transmission, and more preferably those conforming to ISO/IEC18000-6, and still more preferably those conforming to ISO/IEC18000-6 (Type C).

The matching-circuit equipped dipole antenna 1 is an antenna provided the matching circuit section 5 to appropriately perform transmission of electric power between the IC chip 3 and the antenna.

The matching-circuit equipped dipole antenna 1 has the connecting terminal section 4 to electrically connect the antenna to the IC chip 3. The connecting terminal section 4 comprises the first connecting terminal section 4*a* that is connected to one end of the IC chip 3 and the second connecting terminal section 4*b* that is connected to the other end of the IC chip 3. As the matching-circuit equipped dipole antenna 1 of this structure, a generally known dipole antenna comprising a meander line and the like may be used.

The connecting terminal section 4 (the first connecting terminal section 4*a* and the second connecting terminal section 4*b*) is a terminal section to electrically connect the IC chip 3 or an IC strap that comprises the IC chip and an extended electrode, to the matching-circuit equipped dipole antenna 1. The optimum shape of the connecting terminal section 4 depends on the matching-circuit equipped dipole antenna 1 used, but there are no specific requirements for the connecting terminal section 4 if it can maintain electric connection between the IC chip 3 or the IC strap and the matching-circuit equipped dipole antenna 1.

The matching circuit 5 serves to maintain electric connection between the first antenna section 1*a* and the second antenna section 1*b* of the matching-circuit equipped dipole antenna 1. The matching circuit section 5 aims to perform impedance matching to ensure appropriate transmission of electric power between the IC chip 3 and the matching-circuit equipped dipole antenna 1. The matching circuit section 5 may work to maintain direct physical connection between the first antenna section 1*a* and the second antenna section 1*b*, but also may work to maintain direct physical connection between the first connecting terminal section 4*a* and the second connecting terminal section 4*b*. Thus, the matching circuit section 5 may work to maintain electrical connect between the first antenna section 1*a* and the second antenna section 1*b* via the first connecting terminal section 4*a* and the second connecting terminal section 4*b*.

The first parasitic antenna 6 and the second parasitic antenna 7 each are an antenna without a feeding point that serves to assist radio wave transmission function of the matching-circuit equipped dipole antenna 1.

Figure 4:
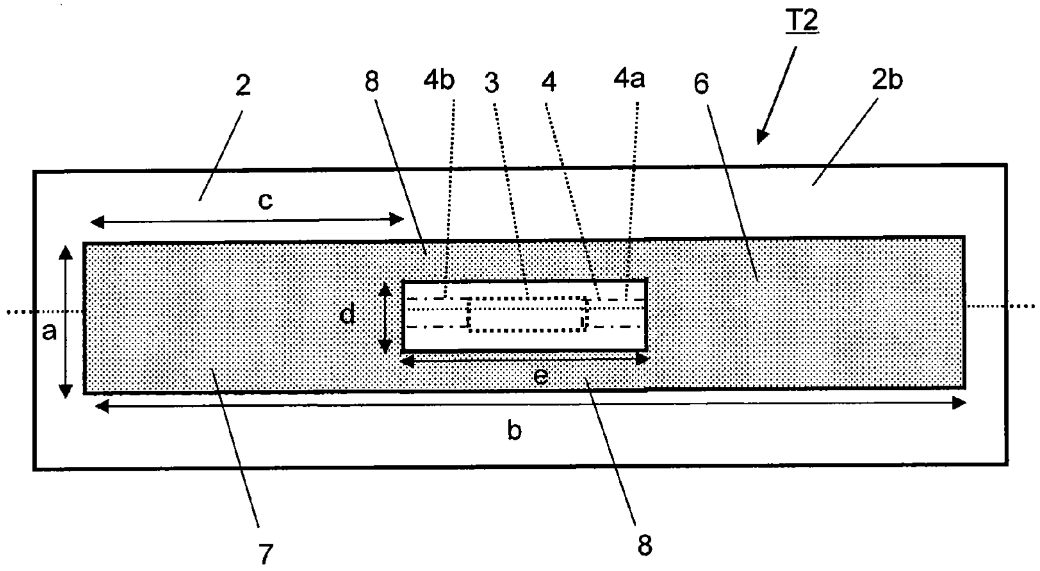
FIG. 4 shows a schematic plan view of another example of the plane of the parasitic antenna of the non-contact IC tag illustrated in FIG. 1.
Figure 5:
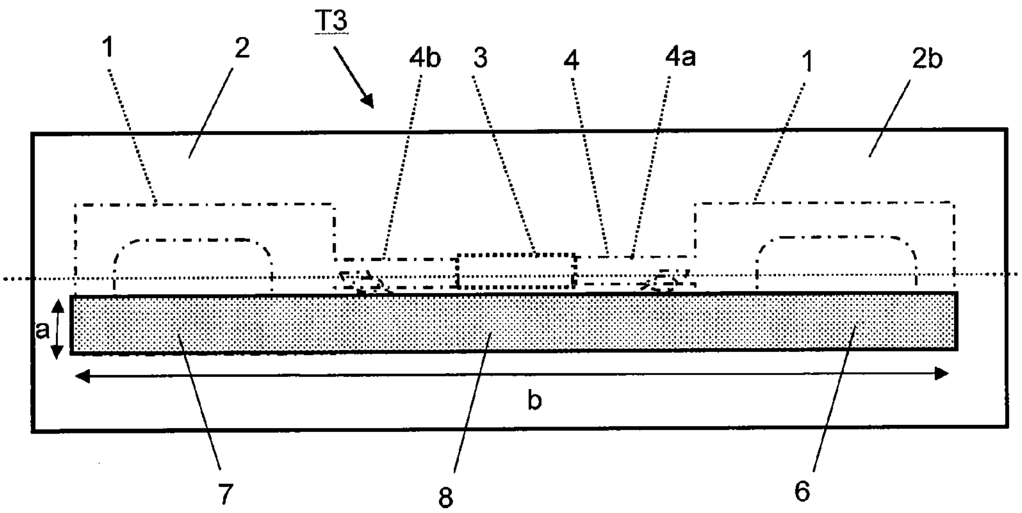
FIG. 5 shows a schematic plan view of still another example of the plane of the parasitic antenna of the non-contact IC tag illustrated in FIG. 1.

FIGS. 4 and 5 show other different examples of the first embodiment of the non-contact IC tag of the invention. FIG. 4 shows a plan view of a second side 2*b* of a first insulating substrate 2 of a non-contact IC tag T2 of the invention. FIG. 5 shows a plan view of a second side 2*b* of a first insulating substrate 2 of a non-contact IC tag T3 of the invention.

In each of the non-contact IC tag T2 shown in FIG. 4 and the non-contact IC tag T3 shown in FIG. 5, the plane of a matching-circuit equipped dipole antenna has the same shape as the shape of the plane of the matching-circuit equipped dipole antenna given in the plan view in FIG. 1 that illustrates the plane of the matching-circuit equipped dipole antenna of the non-contact IC tag T1.

In each of the non-contact IC tag T2 shown in FIG. 4 and the non-contact IC tag T3 shown in FIG. 5, the shape of the plane of a parasitic antenna is different from the shape of the parasitic antenna given in the plan view in FIG. 3 that illustrates the plane of the parasitic antenna of the non-contact IC tag T1.

In the non-contact IC tag T2 shown in FIG. 4 and the non-contact IC tag T3 shown in FIG. 5, the first parasitic antenna 6, the second parasitic antenna 7, and the connected portion 8 meet the following requirements (1A), (1B), and (1C) as in the case of the non-contact IC tag T1 shown in FIG. 3.

(1A) The projection images of the first parasitic antenna 6 and the second parasitic antenna 7 projected onto the first side 2*a* of the first insulating substrate 2 respectively overlap at least partially the first antenna section 1*a* and the second antenna section 1*b* of the matching-circuit equipped dipole antenna 1.

(1B) The first parasitic antenna 6 and the second parasitic antenna 7 are electrically connected to each other through the connected portion 8.

(1C) The projection images of the first parasitic antenna 6, the second parasitic antenna 7, and the connected portion 8 projected onto the first side 2*a* of the first insulating substrate 2 do not overlap the IC chip 3 and the connecting terminal section 4 of the matching-circuit equipped dipole antenna 1.

Figure 6:
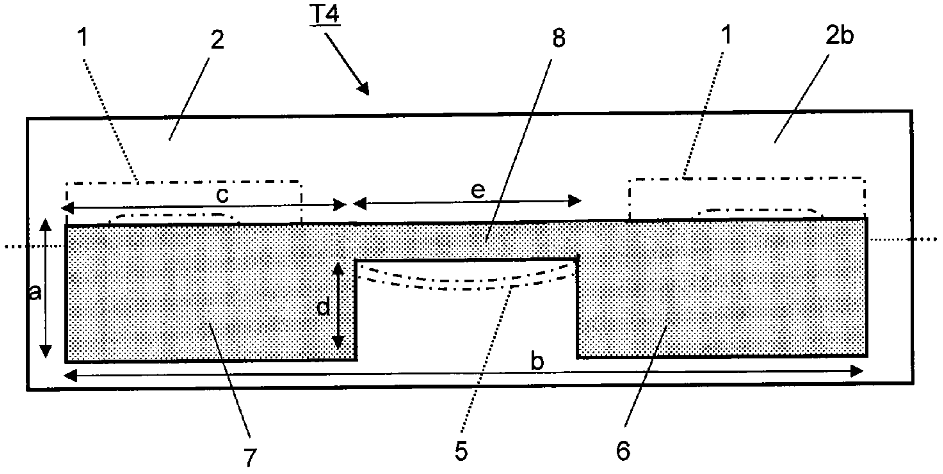
FIG. 6 shows a schematic plan view of an example of the plane of the parasitic antenna in another embodiment (second embodiment) of the non-contact IC tag of the invention.
Figure 7:
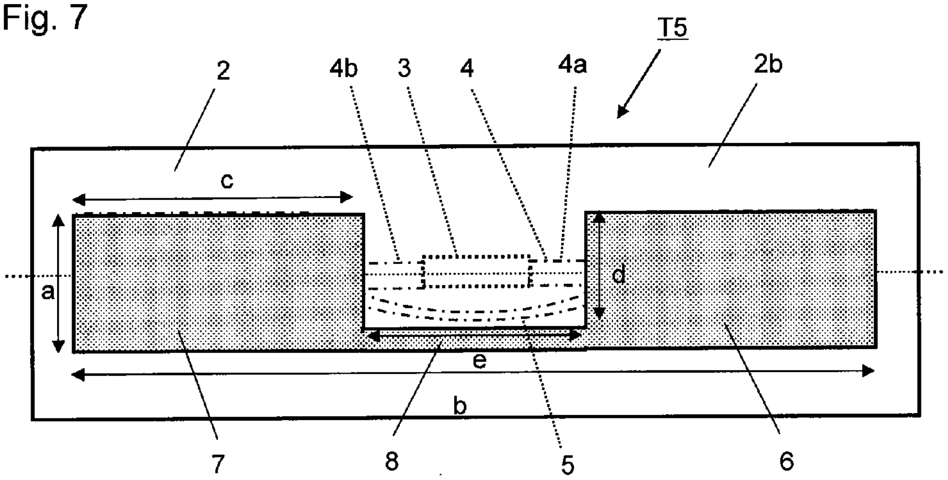
FIG. 7 shows a schematic plan view of a preferable example of the plane of the parasitic antenna of the non-contact IC tag of the invention.

FIG. 6 shows an example of another embodiment (second embodiment) of the non-contact IC tag according to the invention. FIG. 6 shows a plan view of a second side 2*b* of a first insulating substrate 2 of a non-contact IC tag T4 of the invention. The plane of a matching-circuit equipped dipole antenna of the non-contact IC tag T4 shown in FIG. 6 is the same as that of the plane of the matching-circuit equipped dipole antenna given in the plan view in FIG. 1 that illustrates the plane of the matching-circuit equipped dipole antenna of the non-contact IC tag T1.

In the non-contact IC tag T4 shown in FIG. 6, the shape of the plane of a parasitic antenna is different from the shape of the parasitic antenna given in the plan view in FIG. 3 that illustrates the plane of the parasitic antenna of the non-contact IC tag T1.

In the non-contact IC tag T4 shown in FIG. 6, the first parasitic antenna 6, the second parasitic antenna 7, and the connected portion 8 meet the following requirements (2A), (2B), and (2C).

(2A) The projection images of the first parasitic antenna 6 and the second parasitic antenna 7 projected onto the first side 2*a* of the first insulating substrate 2 respectively overlap at least partially the first antenna section 1*a* and the second antenna section 1*b* of the matching-circuit equipped dipole antenna 1.

(2B) The first parasitic antenna 6 and the second parasitic antenna 7 are electrically connected to each other through the connected portion 8.

(2C) The projection images of the first parasitic antenna 6, the second parasitic antenna 7, and the connected portion 8 projected onto the first side 2*a* of the first insulating substrate 2 do not overlap, or only partially overlap, the matching circuit section 5 of the matching-circuit equipped dipole antenna 1.

The expression "respectively overlap at least partially" in the requirements (1A) and (2A) means that the projection images of the first parasitic antenna 6 and the second parasitic antenna 7 projected onto the first side 2*a* of the first insulating substrate 2 should not necessarily fit perfectly the first antenna section 1*a* and the second antenna section 1*b*, respectively, of the matching-circuit equipped dipole antenna 1, but may share only a part of the area with the first antenna section 1*a* and the second antenna section 1*b*.

The expression "only partially overlap" in the requirement (2C) means that they share only a part of the area with the matching circuit 5 for adjustment of impedance etc. In the case of such partial overlapping, the maximum overlap ratio is preferably 50% of the total area that the matching circuit section 5 occupies in the plan view, depending on the shape of each antenna etc. that constitute the non-contact IC tag.

The non-contact IC tag that is illustrated in a concrete manner in the first embodiment and the second embodiment can minimize the influence of the antennae in the IC tag on the impedance fluctuation even when it is attached to a metal member. As a result, electric power necessary to drive the IC chip 3 can be supplied to the IC chip 3 in order to maintain communication between the IC chip 3 and a reader/writer.

FIGS. 7 to 11 show the shape of the plane of the parasitic antenna of the non-contact IC tag T5, T6, T7, T8, or T9, respectively. These represent preferable embodiments of the non-contact IC tag of the invention.

In each of the non-contact IC tags T5, T6, T7, T8, and T9 shown in FIGS. 7 to 11, the shape of the plane of the matching-circuit equipped dipole antenna is the same as that of the plane of the matching-circuit equipped dipole antenna given in the plan view in FIG. 1 that illustrates the plane of the matching-circuit equipped dipole antenna of the non-contact IC tag T1.

In each of the non-contact IC tags T5, T6, T7, T8, and T9 shown in FIGS. 7 to 11, the shape of the plane of the parasitic antenna is different from that of the plane of the parasitic antenna given in the plan view in FIG. 3 that illustrates the plane of the parasitic antenna of the non-contact IC tag T1. These preferable embodiments meet the following requirements (3C1) and (3C2).

(3C1) In addition to the requirement (1C) met by the non-contact IC tag of the first embodiment, the projection images of the first parasitic antenna 6, the second parasitic antenna 7, and the connected portion 8 projected onto the first side 2*a* of the first insulating substrate 2 do not overlap, or only partially overlap, the matching circuit section 5 of the matching-circuit equipped dipole antenna 1.

(3C2) In addition to the requirement (2C) met by the non-contact IC tag of the second embodiment, the projection images of the first parasitic antenna 6, the second parasitic antenna 7, and the connected portion 8 projected onto the first side 2*a* of the first insulating substrate 2 do not overlap the IC chip 3, the first connecting terminal section 4*a*, and the second connecting terminal section 4*b* of the matching-circuit equipped dipole antenna 1.

The non-contact IC tag of the invention in these preferable embodiments has a longer communication distance.

There are no specific limitations on the shape of the first parasitic antenna 6 and the second parasitic antenna 7 if the requirements are met. For size reduction, it is preferable that the entire size of the parasitic antenna composed of the first parasitic antenna 6, the second parasitic antenna 7, and the connected portion 8 is nearly the same as that of the matching-circuit equipped dipole antenna 1. Furthermore, the communication distance can be increased by adjusting the size of each parasitic antenna to the frequency used.

The matching-circuit equipped dipole antenna 1, first parasitic antenna 6, the second parasitic antenna 7, and the connected portion 8 are formed of electric conductors.

Useful generally-known electric conductors include metals containing at least one of the group of gold, silver, copper, aluminum, zinc, nickel, and tin; conductive polymers such as polyacetylene, polyparaphenylene, polyaniline, polythiophene, and polyparaphenylene vinylene; thermosetting resins composed mainly of polyester resin, phenoxy resin, epoxy resin, polyester resin, etc., containing conductive particles such as particles of metals, alloys, and metal oxides of gold, silver, copper, aluminum, platinum, iron, nickel, tin, zinc, solder, stainless steel, ITO, and ferrite, particles of conductive carbon (including graphite), and resin particles produced by plating the aforementioned particles; and conductive ink produced from UV curable resins and other light curable resins composed mainly of unsaturated polyester resin, polyester acrylate resin, urethane acrylate resin, silicone acrylate resin, epoxy acrylate resin, etc.

It is preferable that the first parasitic antenna 6, the second parasitic antenna 7, and the connected portion 8 are made of the same material. The first parasitic antenna 6, the second parasitic antenna 7, and the connected portion 8 may form one seamless body.

The matching-circuit equipped dipole antenna 1, the first parasitic antenna 6, the second parasitic antenna 7, and the connected portion 8 may be produced by a generally known process such as the etching method to etch metal foil and metal deposition layers, the transfer method to cut out metal foil onto a circuit and fix it on a substrate, and the printing method to perform printing with conductive inks.

Figure 12:
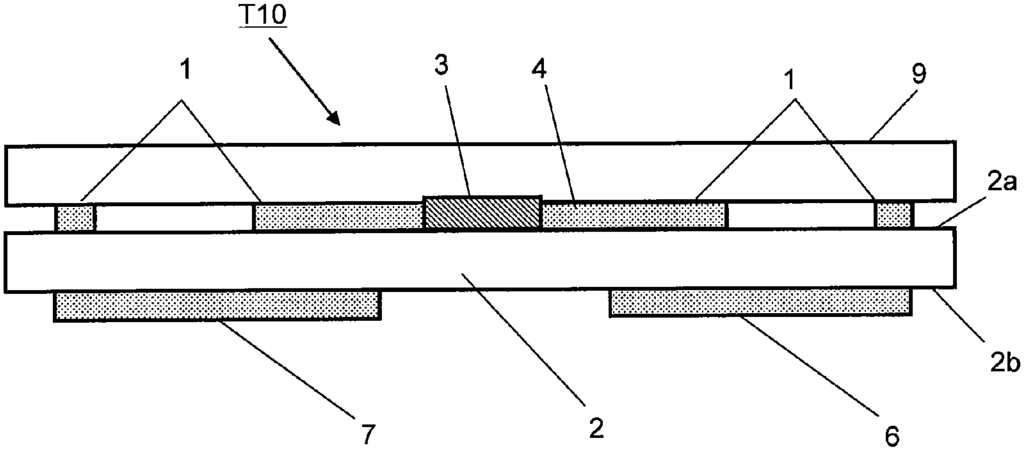
FIG. 12 shows the I-I cross section as indicated by the arrows in FIG. 1, for a non-contact IC tag according to the invention that is produced by laminating a second insulating substrate over the IC tag of the non-contact IC tag.

FIG. 12 shows an example of another preferable embodiment of a non-contact IC tag according to the invention. FIG. 12 shows the I-I cross section as indicated by the arrows in FIG. 1, for a non-contact IC tag T10 of the invention that is produced by laminating a second insulating substrate 9 over the IC tag Ta of the non-contact IC tag T1. The second insulating substrate 9 covers the matching-circuit equipped dipole antenna 1 in the non-contact IC tag T10, and therefore, if the non-contact IC tag T10 is attached to an object, the second insulating substrate 9 existing between them works to maintain electric insulation between the matching-circuit equipped dipole antenna 1 and the object. This allows the non-contact IC tag T10 to achieve a good communication function.

The first insulating substrate 2 can work effectively if it can electrically insulate the IC tag Ta from the first parasitic antenna 6, the second parasitic antenna 7, and the connected portion 8. The second insulating substrate 9 can work effectively if it can electrically insulate the IC tag Ta from that carries the non-contact IC tag.

In view of strength and weight, this substrate is preferably in the form of a resin film. Useful resins for such film include melt-extrudable materials such as polyester, foamable polyester, polyolefin, polylactic acid, polyamide, polyester amide, polyether, polystyrene, polyphenylene sulfide, polyether ester, polyvinyl chloride, poly(meth)acrylate, etc. The film may be in the form of un-stretched film, uni-axially stretched film, or bi-axially stretched film.

In view of price and mechanical characteristics, particularly preferable ones include polyester film, polyolefin film, and polyphenylene sulfide film. In particular, biaxially stretched polyester film is used preferably because it has price advantage, heat resistance, and mechanical characteristics in a good balance.

There are no specific requirements for the thickness of the first insulating substrate 2 if it can electrically insulate the IC tag Ta from the first parasitic antenna 6, the second parasitic antenna 7, and the connected portion 8. In view of flexibility and strength, the thickness is preferably in the range of 0.001 to 0.25 mm, more preferably 0.01 to 0.125 mm, and still more preferably 0.02 to 0.075 mm.

There are no specific requirements for the thickness of the second insulating substrate 9 if it can electrically insulate the IC tag Ta from the object. If the thickness is 0.1 mm or more, communication can be maintained even when the non-contact IC tag is attached to a metal member. If the thickness is 0.5 mm or more, it will be possible to increase the communication distance in the case where the non-contact IC tag is attached to a metal member.

If the non-contact IC tag is not laminated with the second insulating substrate 9, it is preferable that the first insulating substrate 2, the IC tag Ta, the first parasitic antenna 6, the second parasitic antenna 7, and the connected portion 8 are coated with a resin. If the non-contact IC tag according to the invention is laminated with a second insulating substrate 9, it is preferable that the first insulating substrate 2, the IC tag Ta, the first parasitic antenna 6, the second parasitic antenna 7, the connected portion 8, and the second insulating substrate 9 are coated with a resin. Specifically, it is preferable that the non-contact IC tag has both sides coated with a resin or that it is entirely sealed in a resin. The communication distance and durability of the non-contact IC tag is improved, if both sides are coated with a resin or the tag is entirely sealed in a resin.

Preferable resins for the coating or sealing include melt-extrudable ones including polyester, foamable polyester, polyolefin, polylactic acid, polyamide, polyester amide, polyether, polystyrene, polyphenylene sulfide, polyether ester, polyvinyl chloride, and poly(meth)acrylate.

It is preferable that a film processed from these resins is used for the covering or sealing of the non-contact IC tag. The film may be in the form of un-stretched film, uni-axially stretched film, or bi-axially stretched film.

Of these resins, those having a dielectric constant of 1 to 3 in the operating radio wave frequency range are used preferably. The dielectric constant is more preferably 2 to 3. If the resin has a dielectric constant of 1 to 3, the electric power for the IC chip 3 can be increased while the impedance matching of the IC tag Ta is maintained. This can increase the communication distance of the non-contact IC tag that is used in contact with a metal member.

EXAMPLES

The invention is described more specifically below with reference to examples and comparative examples.

Evaluation Method:

Communication Distance of the IC Tag Ta:

The communication distance at 950 MHz is measured. In an anechoic chamber for the 3 m method, an antenna was placed at a height of 90 cm from the floor, whereas a copper plate of 120 mm×40 mm×0.5 mm was placed at the same height facing the former. Then a non-contact IC tag prepared was attached to the plate by sticking the second insulating substrate at the center of the plate, and measurements were made while changing the distance between the copper plate and a reader/writer to determine the maximum communication distance at which communication between the reader/writer and the IC tag Ta is maintained without errors. For this test, a reader/writer produced by Omron Corporation (model: V750-BA50CO4-JP) and an antenna produced by Omron Corporation (model: V750-HS01CA-JP) were used for measurement. Measurements were taken for five samples, and the average of these measurements was taken as the communication distance of the IC tag Ta under test.

Thickness of Each of Components:

Each sample was cut with a microtome in the thickness direction, and the cross section was observed with a 10,000-power SEM to determine the thickness. Measurements for different items were taken in one sample. Measurements were made at five points in one microscopic field for each sample, and the average of the measurements was taken as the thickness of the component.

Example 1

A bi-axially stretched polyethylene terephthalate film (Lumiror (registered trademark) S10 supplied by Toray Industries, Inc.) having a thickness of 0.05 mm was used as the first insulating substrate 2. To produce a metallized film, an aluminum layer having a thickness of 0.002 mm was formed by electron beam (EB) deposition over one side of the first insulating substrate 2.

The resulting metallized film was subjected to wet etching to produce a parasitic antenna having a shape as shown in FIG. 3. The sizes shown in FIG. 3 were as described below: a=8 mm, b=97 mm, c=43.5 mm, d=4 mm, and e=10 mm. The first parasitic antenna 6, second parasitic antenna 7, and connected portion 8 were thus formed.

A UHF tag Ta (ALN-9540-Squiggle supplied by Alien) having an IC chip 3 and a matching-circuit equipped dipole antenna 1 was prepared. An acrylic plate having a thickness of 1 mm was used as a second insulating substrate 9, and the UHF tag Ta was adhered to it. Then, the first side 2*a* of the first insulating substrate 2 was adhered to that side of the second insulating substrate 9 which carried the UHF tag Ta.

These plates were fixed to each other so that the following requirements (1), (2), and (3) were met.

(1) The projection images of the first parasitic antenna 6 and the second parasitic antenna 7 projected onto the second insulating substrate 9 respectively overlap at least partially the first antenna section 1*a* and the second antenna section 1*b* of the matching-circuit equipped dipole antenna 1.

(2) The projection image of the connected portion 8 for the parasitic antennae projected onto the second insulating substrate 9 overlaps the matching circuit section 5 of the matching-circuit equipped dipole antenna 1.

(3) The projection images of the first parasitic antenna 6, the second parasitic antenna 7, and the connected portion 8 projected onto the second insulating substrate 9 do not overlap the IC chip 3 of the UHF tag Ta, and the first connecting terminal section 4*a* and the second connecting terminal section 4*b* of the matching-circuit equipped dipole antenna 1.

The resulting non-contact IC tag T1 had a communication distance of 830 mm.

Example 2

The metallized film obtained in Example 1 was subjected to wet etching to produce a parasitic antenna having a shape as shown in FIG. 4. The sizes shown in FIG. 4 were as described below: a=8 mm, b=97 mm, c=43.5 mm, d=4 mm, and e=10 mm. The first parasitic antenna 6, the second parasitic antenna 7, and the connected portion 8 were thus formed. The resulting metallized film and the second insulating substrate produced in Example 1 were fixed together by the same procedure as in Example 1 to provide a non-contact IC tag T2.

The resulting non-contact IC tag T2 had a communication distance of 690 mm.

Example 3

The metallized film obtained in Example 1 was subjected to wet etching to produce a parasitic antenna having a shape as shown in FIG. 5. The sizes shown in FIG. 5 were as described below: a=4 mm and b=97 mm. The first parasitic antenna 6, the second parasitic antenna 7, and the connected portion 8 were thus formed. The resulting metallized film and the second insulating substrate produced in Example 1 were fixed together by the same procedure as in Example 1 to provide a non-contact IC tag T3.

The resulting non-contact IC tag T3 had a communication distance of 790 mm.

Example 4

A bi-axially stretched polyethylene terephthalate film (Lumiror (registered trademark) S10 supplied by Toray Industries, Inc.) having a thickness of 0.05 mm was used as the first insulating substrate 2. To produce a metallized film, an aluminum layer having a thickness of 0.002 mm was formed by electron beam (EB) deposition over one side of the first insulating substrate 2. The resulting metallized film was subjected to wet etching to produce a parasitic antenna having a shape as shown in FIG. 6. The sizes shown in FIG. 6 were as described below: a=8 mm, b=97 mm, c=43.5 mm, d=4 mm, and e=10 mm. The first parasitic antenna 6, the second parasitic antenna 7, and the connected portion 8 were thus formed.

A UHF tag Ta (ALN-9540-Squiggle supplied by Alien) having an IC chip 3 and a matching-circuit equipped dipole antenna 1 was prepared. An acrylic plate having a thickness of 1 mm was used as a second insulating substrate 9, and the UHF tag Ta was adhered to it. Then, the first side 2*a* of the first insulating substrate 2 was adhered to that side of the second insulating substrate 9 which carried the UHF tag Ta.

These plates were fixed to each other so that the following requirements (1), (2), and (3) were met.

(1) The projection images of the first parasitic antenna 6 and the second parasitic antenna 7 projected onto the second insulating substrate 9 respectively overlap at least partially the first antenna section 1*a* and the second antenna section 1*b* of the matching-circuit equipped dipole antenna 1.

(2) The projection image of the connected portion 8 for the parasitic antennae projected onto the second insulating substrate 9 overlaps the IC chip 3 of the UHF tag Ta, and the first connecting terminal section 4*a* and the second connecting terminal section 4*b* of the matching-circuit equipped dipole antenna 1.

(3) The projection images of the first parasitic antenna 6, the second parasitic antenna 7, and the connected portion 8 projected onto the second insulating substrate 9 do not overlap, or only partially overlap, the matching circuit section 5 of the matching-circuit equipped dipole antenna 1 of the UHF tag Ta.

The resulting non-contact IC tag T4 had a communication distance of 880 mm.

Example 5

Figure 8:
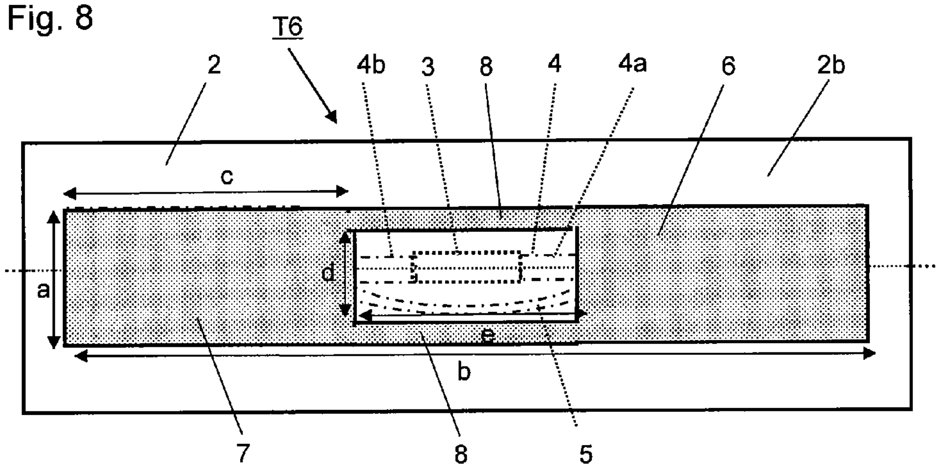
FIG. 8 shows a schematic plan view of another preferable example of the plane of the parasitic antenna of the non-contact IC tag of the invention.
Figure 9:
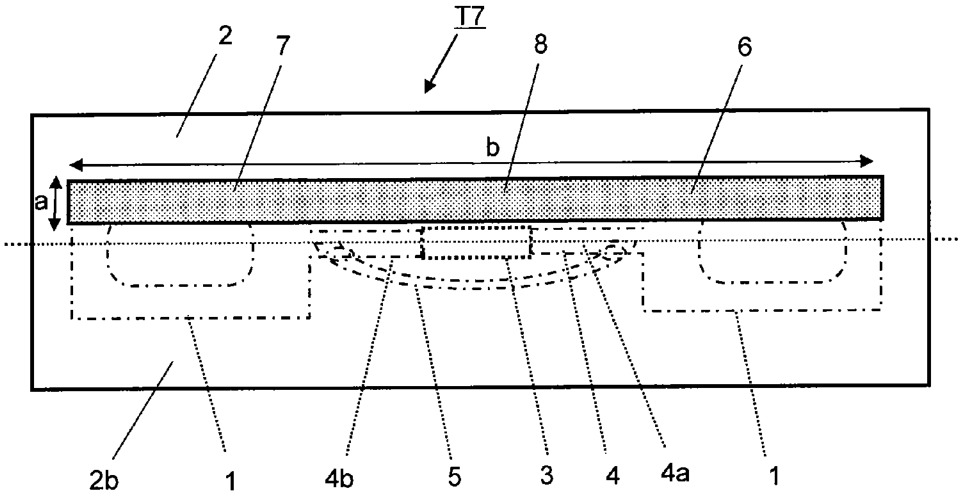
FIG. 9 shows a schematic plan view of still another preferable example of the plane of the parasitic antenna of the non-contact IC tag of the invention.

A bi-axially stretched polyethylene terephthalate film (Lumiror (registered trademark) S10 supplied by Toray Industries, Inc.) having a thickness of 0.05 mm was used as the first insulating substrate 2. To produce a metallized film, an aluminum layer having a thickness of 0.002 mm was formed by electron beam (EB) deposition over one side of the first insulating substrate 2. The resulting metallized film was subjected to wet etching to produce a parasitic antenna having a shape as shown in FIG. 8. The sizes shown in FIG. 8 were as described below: a=8 mm, b=97 mm, c=43.5 mm, d=7 mm, and e=10 mm. The first parasitic antenna 6, the second parasitic antenna 7, and connected portion 8 were thus formed.

A UHF tag Ta (ALN-9540-Squiggle supplied by Alien) having an IC chip 3 and a matching-circuit equipped dipole antenna 1 was prepared. An acrylic plate having a thickness of 1 mm was used as the second insulating substrate 9, and the UHF tag Ta was adhered to it. Then, the first side 2*a* of the first insulating substrate 2 was adhered to that side of the second insulating substrate 9 which carried the UHF tag Ta.

These plates were fixed to each other so that the following requirements (1), (2), and (3) would be met.

(1) The projection images of the first parasitic antenna 6 and the second parasitic antenna 7 projected onto the second insulating substrate 9 respectively overlap at least partially the first antenna section 1*a* and the second antenna section 1*b* of the matching-circuit equipped dipole antenna 1.

(2) The projection images of the first parasitic antenna 6, the second parasitic antenna 7, and the connected portion 8 projected onto the second insulating substrate 9 do not overlap the IC chip 3 of UHF tag Ta, and the first connecting terminal section 4*a* and the second connecting terminal section 4*b* of the matching-circuit equipped dipole antenna 1.

(3) The projection images of the first parasitic antenna 6, the second parasitic antenna 7, and the connected portion 8 projected onto the second insulating substrate 9 do not overlap, or only partially overlap, the matching circuit section 5 of the matching-circuit equipped dipole antenna 1. The resulting non-contact IC tag T6 had a communication distance of 840 mm.

Example 6

Figure 10:
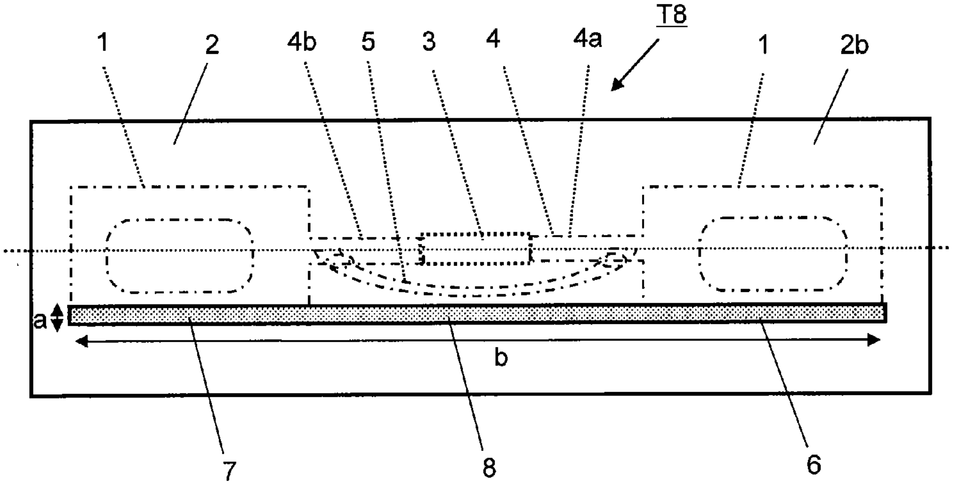
FIG. 10 shows a schematic plan view of still another preferable example of the plane of the parasitic antenna of the non-contact IC tag of the invention.

The metallized film obtained in Example 5 was subjected to wet etching to produce a parasitic antenna having a shape as shown in FIG. 10. The sizes shown in FIG. 10 were as described below: a=2 mm and b=97 mm. The first parasitic antenna 6, the second parasitic antenna 7, and the connected portion 8 were thus formed. The resulting metallized film and the second insulating substrate produced in Example 5 were fixed together by the same procedure as in Example 5 to provide a non-contact IC tag T8.

The resulting non-contact IC tag T8 had a communication distance of 800 mm.

Example 7

Figure 11:
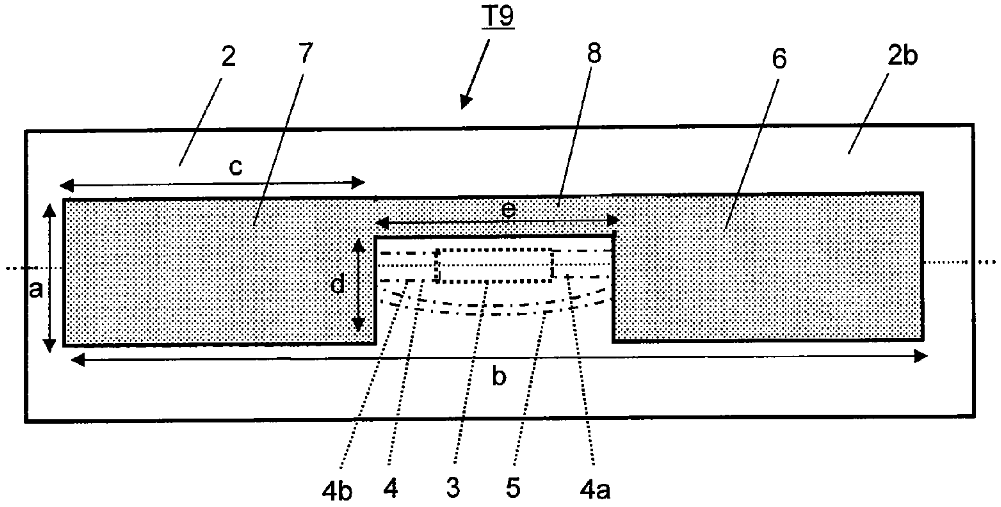
FIG. 11 shows a schematic plan view of still another preferable example of the plane of the parasitic antenna of the non-contact IC tag of the invention.

The metallized film obtained in Example 5 was subjected to wet etching to produce a parasitic antenna having a shape as shown in FIG. 11. The sizes shown in FIG. 11 were as described below: a=8 mm, b=97 mm, c=43.5 mm, d=4 mm, and e=10 mm. The resulting metallized film and the second insulating substrate produced in Example 5 were fixed together by the same procedure as in Example 5 to provide a non-contact IC tag T9.

The resulting non-contact IC tag T9 had a communication distance of 1340 mm.

Example 8

A non-contact IC tag was produced by carrying out the same procedure as in Example 7 except for the following:

fixing the first insulating substrate 2, the IC tag Ta, the first parasitic antenna 6, the second parasitic antenna 7, the connected portion 8, and the second insulating substrate 9, followed by coating the first insulating substrate 2, the IC tag Ta, the first parasitic antenna 6, the second parasitic antenna 7, the connected portion 8, and the second insulating substrate 9 with a convex-shape polyester resin layer having a thickness of 0.25 mm and a polyester resin layer having a thickness of 0.25 mm.

The resulting non-contact IC tag had a communication distance of 2450 mm.

Comparative Example 1

An acrylic plate having a thickness of 1 mm was used as the insulating substrate 9, and a UHF tag Ta (ALN-9540-Squiggle supplied by Alien) was fixed to it to produce a non-contact IC tag.

The resulting non-contact IC tag had a communication distance of 110 mm.

Comparative Example 2

A bi-axially stretched polyethylene terephthalate film (Lumiror S10 supplied by Toray Industries, Inc.) having a thickness of 0.05 mm was used as the first insulating substrate 2. To produce a metallized film, an aluminum layer having a thickness of 0.002 mm was formed by electron beam (EB) deposition over one side of the first insulating substrate 2.

The resulting metallized film was subjected to wet etching to produce a parasitic antenna having a shape as shown in FIG. 5. The sizes shown in FIG. 5 were as described below: a=8 mm and b=97 mm. The first parasitic antenna 6, the second parasitic antenna 7, and the connected portion 8 were thus formed.

A UHF tag Ta (ALN-9540-Squiggle supplied by Alien) having an IC chip 3 and a matching-circuit equipped dipole antenna 1 was prepared. An acrylic plate having a thickness of 1 mm was used as the second insulating substrate 9, and the UHF tag Ta was adhered to it. Then, the first side 2*a* of the first insulating substrate 2 was adhered to that side of the second insulating substrate 9 which carried the UHF tag Ta.

In this step, they were adhering to each other so that the projection images of the first parasitic antenna 6, the second parasitic antenna 7, and the connected portion 8 projected onto the second insulating substrate 9 overlap the IC chip 3 of the UHF tag Ta, the first connecting terminal section 4*a* and the second connecting terminal section 4*b* of the matching-circuit equipped dipole antenna 1, and the matching circuit section 5, thus producing a non-contact IC tag.

It was impossible for the non-contact IC tag to achieve communication with a reader/writer.

Comparative Example 3

A bi-axially stretched polyethylene terephthalate film (Lumiror S10 supplied by Toray Industries, Inc.) having a thickness of 0.05 mm was used as the first insulating substrate 2. To produce a metallized film, an aluminum layer having a thickness of 0.002 mm was formed by electron beam (EB) deposition over one side of the first insulating substrate 2.

The resulting metallized film was subjected to wet etching to produce a parasitic antenna having a shape as shown in FIG. 11. The sizes shown in FIG. 11 were as described below: a=8 mm, b=97 mm, c=43.5 mm, d=4 mm, and e=10 mm. The first parasitic antenna 6, the second parasitic antenna 7, and the connected portion 8 were thus formed. In addition, a slit was made in the connected portion 8 to prevent conduction between the first parasitic antenna 6 and the second parasitic antenna 7.

A UHF tag Ta (ALN-9540-Squiggle supplied by Alien) having an IC chip 3 and a matching-circuit equipped dipole antenna 1 was prepared. An acrylic plate having a thickness of 1 mm was used as the second insulating substrate 9, and the UHF tag Ta was adhered to it. Then, the first side 2*a* of the first insulating substrate 2 was adhered to that side of the second insulating substrate 9 which carried the UHF tag Ta.

These plates were fixed to each other so that the following requirements (1), (2), and (3) were met.

(1) The projection images of the first parasitic antenna 6 and the second parasitic antenna 7 projected onto the second insulating substrate 9 respectively overlap at least partially the first antenna section 1*a* and the second antenna section 1*b* of the matching-circuit equipped dipole antenna 1.

(2) The projection images of the first parasitic antenna 6, the second parasitic antenna 7, and the connected portion 8 projected onto the second insulating substrate 9 do not overlap the IC chip 3 of the UHF tag Ta, and the first connecting terminal section 4*a* and the second connecting terminal section 4*b* of the matching-circuit equipped dipole antenna 1.

(3) The projection images of the first parasitic antenna 6, the second parasitic antenna 7, and the connected portion 8 projected onto the second insulating substrate 9 do not overlap, or partially overlap, the matching circuit section 5 of the matching-circuit equipped dipole antenna 1.

The resulting non-contact IC tag had a communication distance of 500 mm.

Comparative Example 4

A bi-axially stretched polyethylene terephthalate film (Lumiror S10 supplied by Toray Industries, Inc.) having a thickness of 0.05 mm was used as the first insulating substrate 2. To produce a metallized film, an aluminum layer having a thickness of 0.002 mm was formed by electron beam (EB) deposition over one side of the first insulating substrate 2.

The resulting metallized film was subjected to wet etching to produce a parasitic antenna having a shape as shown in FIG. 11. The sizes shown in FIG. 11 were as described below: a=8 mm and c=43.5 mm. Thus a parasitic antenna having a first parasitic antenna 6 and second parasitic antenna 7, but free of a connected portion 8, was formed.

A UHF tag Ta (ALN-9540-Squiggle supplied by Alien) having an IC chip 3 and a matching-circuit equipped dipole antenna was prepared. An acrylic plate having a thickness of 1 mm was used as the second insulating substrate 9, and the UHF tag Ta was adhered to it. Then, the first side 2*a* of the first insulating substrate 2 was adhered to that side of the second insulating substrate 9 which carried the UHF tag Ta.

These plates were fixed to each other so that the following requirements (1), (2), and (3) were met.

(1) The projection images of the first parasitic antenna 6 and the second parasitic antenna 7 projected onto the second insulating substrate 9 respectively overlap at least partially the first antenna section 1*a* and the second antenna section 1*b* of the matching-circuit equipped dipole antenna 1.

(2) The projection images of the first parasitic antenna 6 and the second parasitic antenna 7 projected onto the second insulating substrate 9 do not overlap the IC chip 3 of the UHF tag Ta, and the first connecting terminal section 4*a* and the second connecting terminal section 4*b* of the matching-circuit equipped dipole antenna 1.

(3) The projection images of the first parasitic antenna 6 and the second parasitic antenna 7 projected onto the second insulating substrate 9 do not overlap, or only partially overlap, the matching circuit section 5 of the matching-circuit equipped dipole antenna 1.

The resulting non-contact IC tag had a communication distance of 640 mm.

Major requirements and communication distance of the IC tag Ta produced in each Example and Comparative example are shown in Table 1 in the form of a correlation table.

TABLE 1

| | Element A | Element B | Element C | Element D |
|---|---|---|---|---|
| Example 1 | no | yes | yes | 830 |
| Example 2 | no | yes | yes | 690 |
| Example 3 | no | yes | yes | 790 |
| Example 4 | yes | no | yes | 880 |
| Example 5 | no | no | yes | 840 |
| Example 6 | no | no | yes | 800 |
| Example 7 | no | no | yes | 1340 |
| Example 8 | no | no | yes | 2450 |
| Comparative example 1 | — | — | — | 110 |
| Comparative example 2 | yes | yes | yes | 0 |
| Comparative example 3 | no | no | no | 500 |
| Comparative example 4 | no (No connected portion between parasitic antennae) | no (No connected portion between parasitic antennae) | no | 640 |

Explanation of row items in Table:

Element A: Projection images of first parasitic antenna, second parasitic antenna, and connected portion projected onto second insulating substrate overlap IC chip and connecting terminal sections of dipole antenna.

Element B: Projection images of first parasitic antenna, second parasitic antenna, and connected portion projected onto second insulating substrate overlap matching circuit section of dipole antenna.

Element C: First parasitic antenna and second parasitic antenna are electrically connected.

Element D: Communication distance (mm)

From comparison between Examples and Comparative example 1, it is found that the parasitic antennae formed on the IC tag Ta as in the first embodiment and the second embodiment of the non-contact IC tag of the invention serve to achieve a seven-fold improvement in the communication distance in the case where the non-contact IC tag is attached to a metal member.

From comparison between Examples 1 to 3 and Comparative example 2, it is found that if the non-contact IC tag is produced so that the projection images of the first parasitic antenna 6, the second parasitic antenna 7, and the connected portion 8 projected onto the first side 2*a* of the first insulating substrate 2 do not overlap the IC chip 3 of the IC tag Ta, and the first connecting terminal section 4*a* and second connecting terminal section 4*b* of the matching-circuit equipped dipole antenna 1, the non-contact IC tag can maintain a sufficient communication function even when the non-contact IC tag is attached to a metal member.

From comparison between Example 4 and Comparative example 2, it is found that if the non-contact IC tag is produced so that the projection images of the first parasitic antenna 6, the second parasitic antenna 7, and the connected portion 8 projected onto the first side 2*a* of the first insulating substrate 2 do not overlap, or only partially overlap, the matching circuit section 5 of the matching-circuit equipped dipole antenna 1 of the IC tag Ta, the non-contact IC tag can maintain a sufficient communication function even when the non-contact IC tag is attached to a metal member.

From comparison between Examples 1 to 4 and Examples 5 to 7, it is found that if the non-contact IC tag is produced so that the projection images of the first parasitic antenna 6, the second parasitic antenna 7, and the connected portion 8 projected onto the first side 2*a* of the first insulating substrate 2 do not overlap the IC chip 3 of the IC tag Ta, and the first connecting terminal section 4*a* and second connecting terminal section 4*b* of the matching-circuit equipped dipole antenna 1, and at the same time do not overlap, or only partially overlap, the matching circuit section 5 of the matching-circuit equipped dipole antenna 1, this can further increase the communication distance of the non-contact IC tag that is used in contact with a metal member.

From comparison between Example 7 and Comparative examples 3 and 4, it is found that if the non-contact IC tag is produced so that electric conduction between the first parasitic antenna 6 and the second parasitic antenna 7 is maintained through the connected portion 8, this serves to increase the communication distance of the non-contact IC tag that is used in contact with a metal member.

From comparison Example 7 and Example 8, it is found that if the non-contact IC tag is produced so that the first insulating substrate 2, the IC tag Ta, the first parasitic antenna 6, the second parasitic antenna 7, the connected portion 8, and the second insulating substrate 9 are coated with a resin, this serves to further increase the communication distance of the non-contact IC tag that is used in contact with a metal member.

Where the non-contact IC tag according to embodiments of the invention is used, the communication function of the IC chip will not deteriorate even when the IC tag is in direct contact with a metal object. The non-contact IC tag serves for efficient management of metal objects.

REFERENCE SIGNS LIST

1 antenna section of a matching-circuit equipped dipole antenna

1*a* first antenna section of the matching-circuit equipped dipole antenna

1*b* second antenna section of the matching-circuit equipped dipole antenna

2 first insulating substrate

2*a* one side (first side) of the first insulating substrate

2*b* the other side (second side) of the first insulating substrate

3 IC chip

4 connecting terminal section of the matching-circuit equipped dipole antenna

4*a* first connecting terminal section of the matching-circuit equipped dipole antenna

4*b* second connecting terminal section of the matching-circuit equipped dipole antenna

5 matching circuit section of the matching-circuit equipped dipole antenna

6 first parasitic antenna

7 second parasitic antenna

8 connected portion to connect the first parasitic antenna and the second parasitic antenna

9 second insulating substrate a, b, c, d, e size (length) of each section

T1, T2, T3, T4, T5, T6, T7, T8, T9, T10 non-contact IC tag according to the invention Ta IC tag

The invention claimed is:

1. A non-contact IC tag including an IC tag comprising a first insulating substrate, an IC chip fixed on one side of said first insulating substrate and a matching-circuit equipped dipole antenna electrically connected to said IC chip, and a first parasitic antenna and a second parasitic antenna spaced with a distance and fixed on the other side of said first insulating substrate, wherein said matching-circuit equipped dipole antenna has two antenna sections spaced with a distance, two connecting terminal sections each electrically connecting each of said two antenna sections to said IC chip, and a matching circuit section electrically connecting said two antenna sections to each other, and wherein (1-a) the projection images of said first parasitic antenna and said second parasitic antenna projected onto said one side of said first insulating substrate respectively overlap at least partially said two antenna sections of said matching-circuit equipped dipole antenna, (1-b) said first parasitic antenna and said second parasitic antenna are electrically connected to each other through a connected portion, and in addition, (1-c) the projection images of said first parasitic antenna, said second parasitic antenna, and said connected portion projected onto said one side of said first insulating substrate do not overlap said IC chip and said two connecting terminal sections of said matching-circuit equipped dipole antenna.

2. The non-contact IC tag according to claim 1, wherein said first insulating substrate comprises a resin film.

3. The non-contact IC tag according to claim 1, wherein a second insulating substrate is laminated over said one side of said first insulating substrate.

4. The non-contact IC tag according to claim 1, wherein said first insulating substrate, said IC tag, said first parasitic antenna, said second parasitic antenna, and said connected portion are covered with a resin.

5. The non-contact IC tag according to claim 3, wherein said first insulating substrate, said IC tag, said first parasitic antenna, said second parasitic antenna, said connected portion, and said second insulating substrate are covered with a resin.

6. A non-contact IC tag including an IC tag comprising a first insulating substrate, an IC chip fixed on one side of said first insulating substrate and a matching-circuit equipped dipole antenna electrically connected to said IC chip, and a first parasitic antenna and a second parasitic antenna spaced with a distance and fixed on the other side of said first insulating substrate, wherein said matching-circuit equipped dipole antenna has two antenna sections spaced with a distance, two connecting terminal sections each electrically connecting each of said two antenna sections to said IC chip, and a matching circuit section electrically connecting said two antenna sections to each other, and wherein (2-a) the projection images of said first parasitic antenna and said second parasitic antenna projected onto said one side of said first insulating substrate respectively overlap at least partially said two antenna sections of said matching-circuit equipped dipole antenna, (2-b) said first parasitic antenna and said second parasitic antenna are electrically connected to each other through a connected portion, and in addition, (2-c) the projection images of said first parasitic antenna, said second parasitic antenna, and said connected portion projected onto said one side of said first insulating substrate do not overlap, or only partially overlap, said matching circuit section of said matching-circuit equipped dipole antenna.

7. The non-contact IC tag according to claim 6, wherein the projection images of said first parasitic antenna, said second parasitic antenna, and said connected portion projected onto said one side of said first insulating substrate do not overlap said matching circuit section of said matching-circuit equipped dipole antenna.

8. The non-contact IC tag according to claim 6, wherein the projection images of said first parasitic antenna, said second parasitic antenna, and said connected portion projected onto said one side of said first insulating substrate do not overlap said IC chip and said two connecting terminal sections of said matching-circuit equipped dipole antenna.

9. The non-contact IC tag according to claim 7, wherein the projection images of said first parasitic antenna, said second parasitic antenna, and said connected portion projected onto said one side of said first insulating substrate do not overlap said IC chip and said two connecting terminal sections of said matching-circuit equipped dipole antenna.

10. The non-contact IC tag according to claim 6, wherein said first insulating substrate comprises a resin film.

11. The non-contact IC tag according to claim 6, wherein a second insulating substrate is laminated over said one side of said first insulating substrate.

12. The non-contact IC tag according to claim 6, wherein said first insulating substrate, said IC tag, said first parasitic antenna, said second parasitic antenna, and said connected portion are covered with a resin.

* * * * *